US012205398B2

(12) United States Patent
Ashimine (10) Patent No.: US 12,205,398 B2
(45) Date of Patent: Jan. 21, 2025

(54) BIOMETRIC AUTHENTICATION DEVICE

(71) Applicant: Alps Alpine Co., Ltd., Tokyo (JP)

(72) Inventor: Katsunari Ashimine, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 75 days.

(21) Appl. No.: 18/312,749

(22) Filed: May 5, 2023

(65) Prior Publication Data

US 2023/0401884 A1 Dec. 14, 2023

(30) Foreign Application Priority Data

Jun. 14, 2022 (JP) ................................ 2022-095475

(51) Int. Cl.
*G06V 40/12* (2022.01)
*H04N 23/11* (2023.01)
*H04N 23/56* (2023.01)

(52) U.S. Cl.
CPC ............. *G06V 40/12* (2022.01); *H04N 23/11* (2023.01); *H04N 23/56* (2023.01)

(58) Field of Classification Search
CPC ........ G06V 40/12; G06V 40/67; H04N 23/11; H04N 23/56
See application file for complete search history.

(56) References Cited

U.S. PATENT DOCUMENTS

| 11,340,475 | B2 | 5/2022 | Yamamoto et al. | |
|---|---|---|---|---|
| 11,803,067 | B2* | 10/2023 | Krauthamer | H04N 9/3179 |
| 2013/0243264 | A1* | 9/2013 | Aoki | G06V 40/67 |
| | | | | 382/115 |
| 2016/0201888 | A1* | 7/2016 | Ackley | H04N 5/33 |
| | | | | 362/276 |
| 2019/0196213 | A1* | 6/2019 | Yamamoto | G02B 30/56 |
| 2020/0143132 | A1* | 5/2020 | Iida | G06K 7/10722 |

(Continued)

FOREIGN PATENT DOCUMENTS

| JP | 2017-107165 A | 6/2017 |
|---|---|---|
| JP | 2018-081138 A | 5/2018 |

(Continued)

OTHER PUBLICATIONS

Saji et al., Non-contact Hand Vein Image by Use of Aerial Guiding Illumination with AIRR, Proceedings of the International Display Workshops, Nov. 2019 (retrieved via Internet Sep. 13, 2004 at https://doi.org/10.36463/idw.2019.1696) (Year: 2019).*

(Continued)

*Primary Examiner* — Timothy R Newlin
(74) *Attorney, Agent, or Firm* — Crowell & Moring LLP (57) ABSTRACT

A biometric authentication device of the present invention includes a light guide layer on which a light diffusion unit for displaying an aerial image representing a design of a living body at a height is formed, a light source that irradiates the light guide layer with light, a polarized beam splitter disposed on an upper surface side of the light guide layer, a retroreflective layer disposed on a bottom surface side of the light guide layer, and an imaging camera that captures an image of a living body superimposed on the aerial image through an opening formed in the retroreflective layer, and performs biometric authentication based on an image captured by an imaging camera.

8 Claims, 5 Drawing Sheets

(56) References Cited

U.S. PATENT DOCUMENTS

2020/0202101 A1* 6/2020 Howell ............. G06V 40/1312
2022/0137428 A1* 5/2022 Krauthamer ............. G02B 5/12

FOREIGN PATENT DOCUMENTS

JP        2019-066833 A     4/2019
JP        2019-101055 A     6/2019

OTHER PUBLICATIONS

Extended European Search Report for European Patent Application No. 23175054.8 dated Sep. 12, 2023, 9 pages.

Saji et al., "Non-contact Hand Vein Imaging by Use of Aerial Guiding Illumination with AIRR," *Proceedings of the international display workshops*, https://confit.atlas.jp/guide/event-img/idw2019/INPp1-1/public/pdf_archive?type=in, Nov. 28, 2019, 4 pages.

Saji et al., "Accuracy Comparison of Positional Guidance to Aerial Guiding Illumination Formed with AIRR," https://www.jstage.jst.go.jp/article/jsapmeeting/2020.2/2020.2_833/_pdf/-char.ia, Nov. 9, 2020, 1 page.

\* cited by examiner

BIOMETRIC AUTHENTICATION DEVICE

BACKGROUND

1. Related Application

The present application claims priority to Japanese Patent Application Number 2022-095475, filed on Jun. 14, 2022, the entirety of which is hereby incorporated by reference.

2. Field

The present disclosure relates to a biometric authentication device with a function of displaying an image in the air using retroreflection.

3. Description of the Related Art

Aerial Imaging by retro-reflection (AIRR) is known. For example, in order to enable observation of an image formed in the air from a wider angle, the display device of JP 2017-107165 A uses two retroreflective members, and one of the retroreflective members is disposed on an emission axis of a light source. For easy adjustment of the position at which an image is formed, an image display device in JP 2018-81138 A includes a semitransparent mirror, a retroreflective member, and an image output device disposed parallel to each other. In order to inhibit a reduction in the viewability of an image, an image display device in JP 2019-66833 A reduces the number of times of transmission of light through a retardation member ($\lambda/4$ plate). For achievement of a reduction in device thickness, a display device in JP 2019-101055 A includes a display and a retroreflective member disposed parallel to a beam splitter, and a deflecting optical element disposed on the display.

SUMMARY

In various electronic devices and electronic systems, personal authentication using a living body such as a fingerprint or a vein has been advanced. For example, in a vein authentication of the palm, a hand is placed on the surface of a transparent acrylic plate, the vein of the palm is imaged by a camera from the back surface side of the acrylic plate, and whether or not the person is the person himself/herself is authenticated based on the imaged image.

In conventional biometric authentication, a contact authentication in which a hand is brought into contact with an acrylic plate is mainly used; on the other hand, non-contact biometric authentication is also under development. In the contact type of authentication, since the hand is placed on the acrylic plate, stable photographing of the vein by the camera is possible. However, in the non-contact type of authentication, there are problems such as the camera not focusing because the height of the hand is not fixed in the air, and it takes time and effort to achieve focus.

Figure 1A:
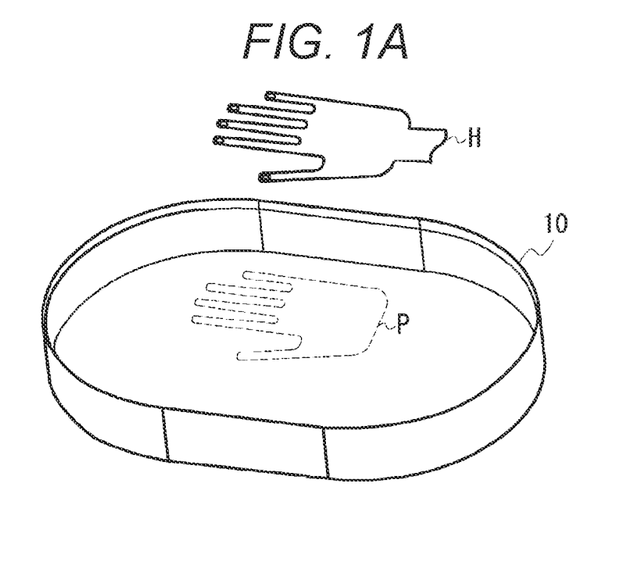
FIGS. 1A to 1E are diagrams illustrating a schematic configuration of a conventional biometric authentication device.

Therefore, for example, a proposal has been made to express an appropriate position of the hand with color of illumination. FIGS. 1A to 1E illustrate a schematic configuration of a biometric authentication device equipped with such a function. As illustrated in FIG. 1A, an image P of the hand is lit on the surface or inside of an authentication device 10, the user holds a palm H in the air to be aligned with the position of the image P, and then the palm H is imaged by the built-in camera of the biometric authentication device 10.

Figure 1B:
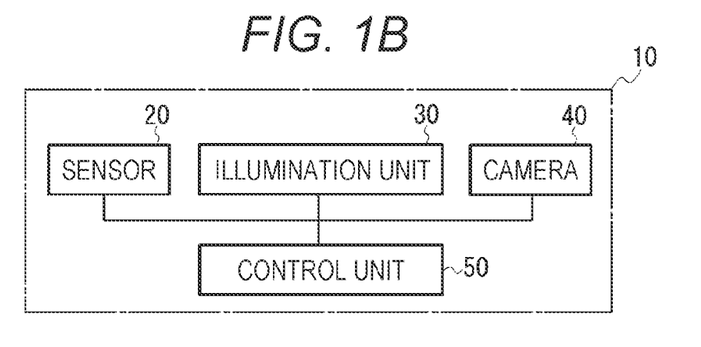

FIG. 1B is a block diagram illustrating an internal configuration of the biometric authentication device 10. The biometric authentication device 10 includes a sensor 20 that measures a distance to the palm H, an illumination unit 30 that illuminates the image P with a color corresponding to the measured distance, a camera that images the palm H, and a control unit 50 that controls each unit. In some embodiments, the control unit 50 and/or illumination unit 30 may be implemented with circuitry, a controller, a hardwired processor, and/or a processor configured to execute instructions stored in a memory.

Figure 1C:
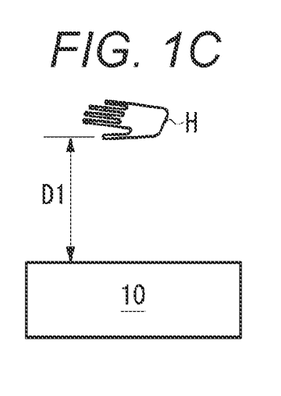
Figure 1D:
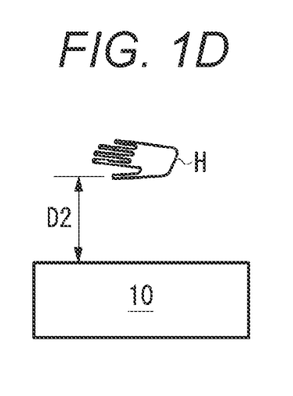
Figure 1E:
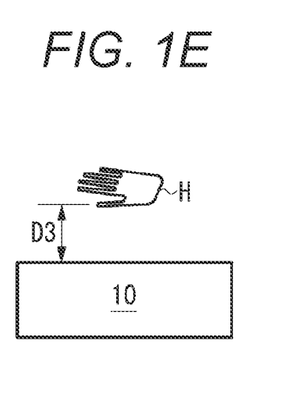

As illustrated in FIG. 1C, when the palm H is approaching the biometric authentication device 10 (provided that, the height D1 is larger than the focal length of the camera 40), the control unit 50 lights the image P in blue via the illumination unit 30 to notify that the palm H is too far from the appropriate position. As illustrated in FIG. 1D, when a height D2 to the palm H is that of an appropriate position (substantially matched with the focal length), the control unit 50 lights the image P in green via the illumination unit 30 to notify the user that the palm H is at the correct height. At this time, the camera 40 captures an image of the palm H. As illustrated in FIG. 1E, in a case where a height D3 to the palm H is such that it is too close, the control unit 50 lights the image P in red to notify the user that the palm H is too close.

As described above, the conventional biometric authentication device can notify the user of whether the height of the hand is appropriate by changing the color in which the image P is lit. However, since the user does not intuitively know the appropriate height of the hand, the user still needs to perform work such as adjusting the height of the palm H while checking the lighting color of the image P, which is troublesome.

An object of the present disclosure is to solve such a conventional problem, and to provide a biometric authentication device in which the position for an authentication target such as a hand or a finger is able to be intuitively understood.

The biometric authentication device according to the present disclosure is a biometric authentication device with a function of displaying an aerial image using retroreflection, the biometric authentication device including a light guide layer on which a design for an aerial image is formed, a light source that irradiates the light guide layer with light, a polarization beam splitter disposed on one principal surface side of the light guide layer, a retroreflective layer disposed on a side of the other principal surface of the light guide layer, the other principal surface facing the one principal surface, and an imaging unit that captures an image of a living body in the vicinity of a region where an aerial image is displayed via an opening formed in the retroreflective layer, in which the biometric authentication device performs biometric authentication based on the image captured by the imaging unit.

In one aspect, a polarization filter having a polarization direction different from that of the polarization beam splitter is provided at a position matching the opening. In one aspect, a polarization direction of the polarization filter is orthogonal to a polarization direction of the polarization beam splitter. In one aspect, the imaging unit captures an image of a living body at a time when the light source is turned off. In one aspect, display of the aerial image and imaging of the imaging unit are time-divisionally controlled. In one aspect, the imaging unit includes an infrared camera, and a visible light filter that shields visible light is provided at a position matching the opening. In one aspect, the aerial image is generated at a position symmetrical to the design with respect to a surface of the polarization beam splitter, and a focal point of the imaging unit is adjusted to a position of the aerial image. In one aspect, the biometric authentication device further includes an output unit that notifies the user that imaging by the imaging unit has ended. In an aspect, the living body is a fingerprint or a vein.

According to the present disclosure, since the aerial image is displayed so as to guide the living body to the position where the biometrics are to be placed in the air, and the biometrics placed at the position is imaged, the user can intuitively recognize the position to which the biometrics are held, and it is possible to eliminate troublesome biometric authentication due to non-contact.

DETAILED DESCRIPTION

Embodiments of the present disclosure will be described. A biometric authentication device of the present disclosure relates to a thin aerial video authentication device with a function of displaying an aerial image in a three-dimensional space without wearing special glasses or the like. The user holds a living body over a position guided by an aerial image, the living body at the position is imaged by an imaging camera, and biometric authentication is performed. Note that the drawings referred to in the description of the following examples include exaggerations and emphases for easy understanding of the disclosure, and thus it should be noted that the drawings do not necessarily indicate the shapes or scales of real products, directly.

Figure 2A:
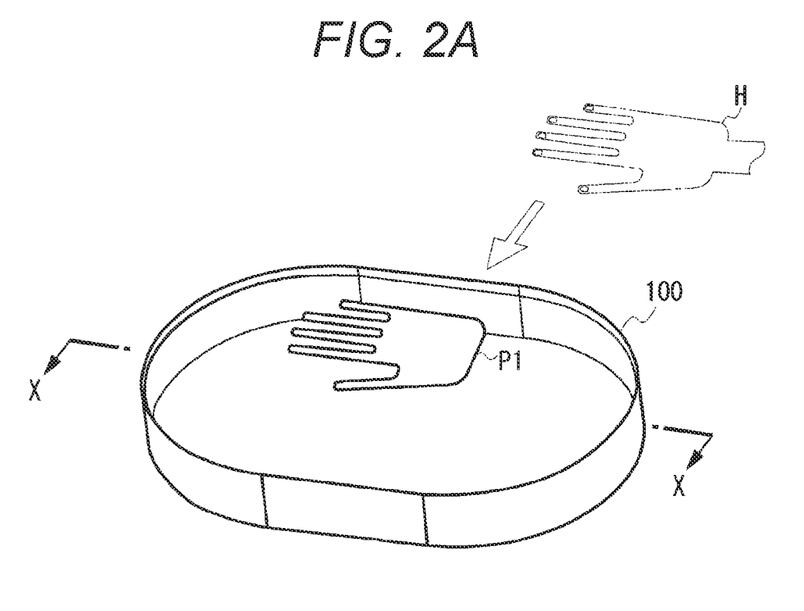
FIG. 2A is an external perspective view of a biometric authentication device according to a first example of the present disclosure.
Figure 2B:
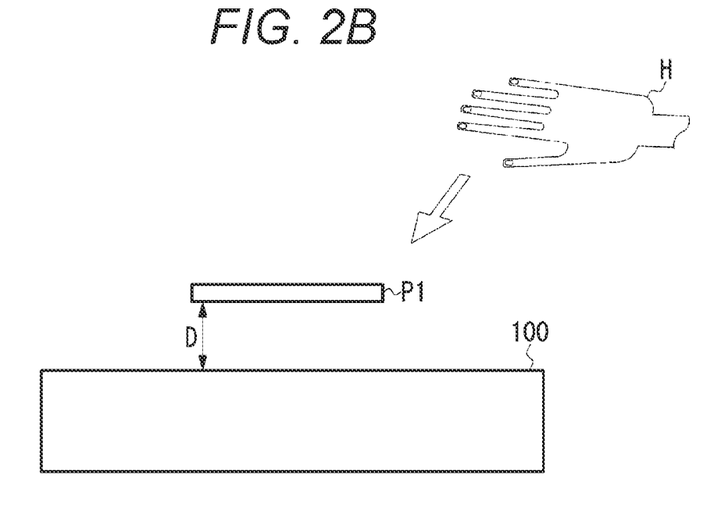
FIG. 2B is a side view thereof.

Next, examples of the present disclosure will be described in detail. FIG. 2A is a schematic perspective view of a biometric authentication device according to a first example of the present disclosure, and FIG. 2B is a side view thereof. A biometric authentication device 100 of the present example displays an aerial image P1 at a position of a height D from a surface of a casing such as a housing. The user holds a palm H to match the aerial image P1 at the height D, the palm H at the height D is imaged by the built-in imaging camera, and personal authentication is performed. The user can intuitively hold the palm H by visually recognizing the aerial image P1. The height D is a distance at which the palm H can be clearly imaged by the imaging camera. The living body to be authenticated is not particularly limited, and is, for example, a fingerprint, a vein, or the like of a palm or a finger.

Figure 3:
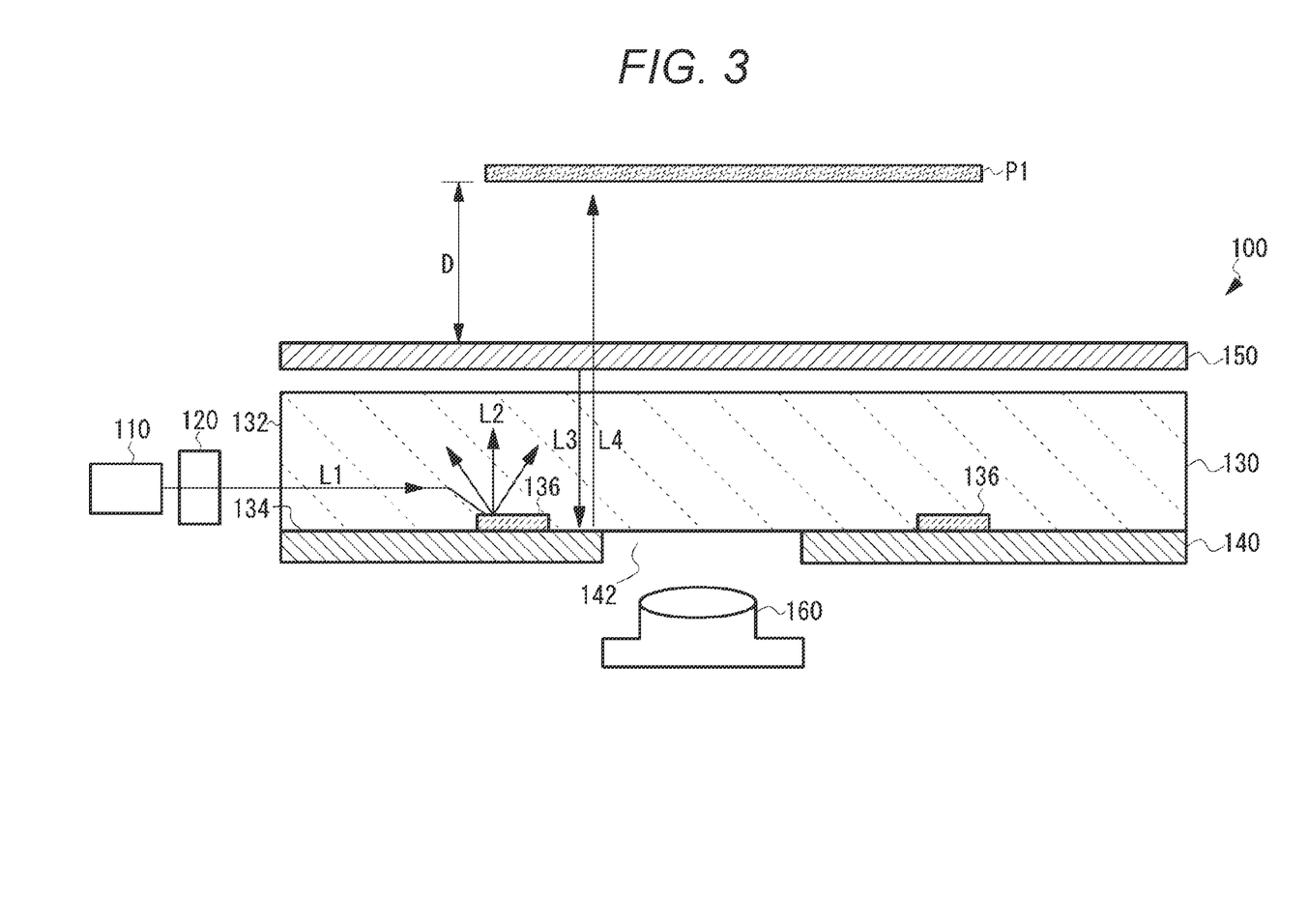
FIG. 3 is a schematic cross-sectional view taken along line X-X of the biometric authentication device illustrated in FIGS. 2A and 2B.

FIG. 3 is a schematic cross-sectional view illustrating a configuration of the biometric authentication device 100 illustrated in FIG. 2A taken along line X-X. As illustrated in the drawing, the biometric authentication device 100 includes a light source 110, a polarization filter 120, a light guide layer 130, a retroreflective layer 140, a polarization beam splitter 150, and an imaging camera 160.

The light source 110 is disposed in the vicinity of a side portion 132 of the light guide layer 130, emits light having a constant emission angle (or radiation angle) toward the light guide layer 130, and uniformly irradiates the inside of the light guide layer 130 with light. The light source 110 is not particularly limited, but for example, a light emitting element such as a light emitting diode or a laser diode can be used. The number of light emitting elements is not particularly limited.

The polarization filter 120 is provided between the light source 110 and the incident surface (side portion) 132 of the light guide layer 130. The polarization filter 120 is, for example, a polarizing film or a DBEF (reflective polarizing element), and converts light from the light source 110 into a certain polarization state (for example, linearly polarized light). The polarization filter 120 is particularly useful in a case where the light from the light source 110 is unpolarized, but may be omitted when the light from the light source 110 is polarized.

The light guide layer 130 corresponds to a transparent optical member in a tabular shape or a film shape, having a flat upper face, a flat bottom face, and side faces connecting the upper face and the bottom face. The plane shape of the light guide layer 130 is not particularly limited and thus is, for example, rectangular. For the light guide layer 130, a publicly known light guiding layer, for example, made of glass, an acrylic plastic, a polycarbonate resin, or a cycloolefin-based resin can be used.

A light diffusion unit 136 for diffusing or scattering light in the vertical direction is formed on the bottom portion or the bottom surface 134 of the light guide layer 130. The light diffusion unit 136 generates a design (original image) of the aerial image P1, and in this example, the light diffusion unit 136 generates a design of a palm, which is a living body to be authenticated. The light diffusion unit 136 is formed, for example, by processing a fine structure such as a dot pattern, by laser processing or printing, on the bottom surface of the light guide layer 130.

The retroreflective layer 140 is formed on the bottom surface side of the light guide layer 130. The retroreflective layer 140 is an optical member that reflects light in the same direction as the incident light. The retroreflective layer 140 is not particularly limited in configuration, and thus, for example, includes a prism type retroreflective element, such as a triangular pyramid type retroreflective element or a full-cube corner type retroreflective element, or a bead type retroreflective element. A protective film, a retardation film (for example, λ/4 film), or the like may be interposed between the light guide layer 130 and the retroreflective layer 140.

The polarization beam splitter 150 is disposed on the upper surface side of the light guide layer 130. The polarization beam splitter 150 is an optical element that transmits a part of incident light and reflects a part of the incident light, and is a polarization separation element that divides the incident light into a p-polarization component and an s-polarization component. For example, the polarization beam splitter 150 transmits part of light in a certain polarization state and reflects part of the light.

A light L1 incident from the side portion 132 of the light guide layer 130 travels inside while being totally reflected by, for example, the upper surface and the bottom surface of the light guide layer 130, while a part of the light L2 is diffused and scattered in the vertical direction by the light diffusion unit 136, and the diffused and scattered light L2 is transmitted through the upper surface of the light guide layer 130 and reflected by the polarization beam splitter 150. A part L3 of the light reflected by the polarization beam splitter 150 is reflected by the retroreflective layer 140 in the same direction as the incident light, and a part of the light L4 reflected by the retroreflective layer 140 is transmitted through the polarization beam splitter 150 to generate the aerial image P1. The aerial image P1 is obtained by floating a design (original image) generated by the light diffusion unit 136 in the air in a posture as it is, the aerial image P1 is generated at a position of a height D from the polarization beam splitter 150, and the height D is a position symmetrical to the light diffusion unit 136 with respect to the plane of the polarization beam splitter 150.

In addition to the function of displaying the aerial image P1 at the position of the height D, the biometric authentication device 100 of the present example has a function of imaging the palm H of the user superimposed on the height of the aerial image P1 as illustrated in FIGS. 2A and 2B. In order to obtain an imaging function, an opening 142 penetrating the retroreflective layer 140 is formed, and the imaging camera 160 captures an image of the palm H via the opening 142. The position and size of the opening 142 are selected so that the entire palm H can be imaged by the imaging camera 160. Furthermore, the focal point of the imaging camera 160 is adjusted to the vicinity of the height D of the aerial image P1. For example, when the height of the aerial image P1 is D, the focal length F of the imaging camera 160 is adjusted to F≈2D.

When the user's palm H is placed in the air to overlap the aerial image P1, the imaging camera 160 images the palm H. Although the imaging timing is not particularly limited, for example, the aerial image P1 may be automatically captured within a certain period after being displayed, or the user may give an instruction of imaging by the imaging camera 160, or in a case where the biometric authentication device is equipped with a distance sensor, a proximity sensor, or the like, the imaging camera 160 may capture an image in response to detection of the living body by the sensor. Image data captured by the imaging camera 160 is used for personal authentication of the user.

As described above, according to the present example, since the aerial image P1 representing the design to be biometrically authenticated is displayed in the air to guide the position at which the living body is to be held, the user can intuitively place the living body such as the palm or the finger on the height D of the aerial image P1.

Figure 4:
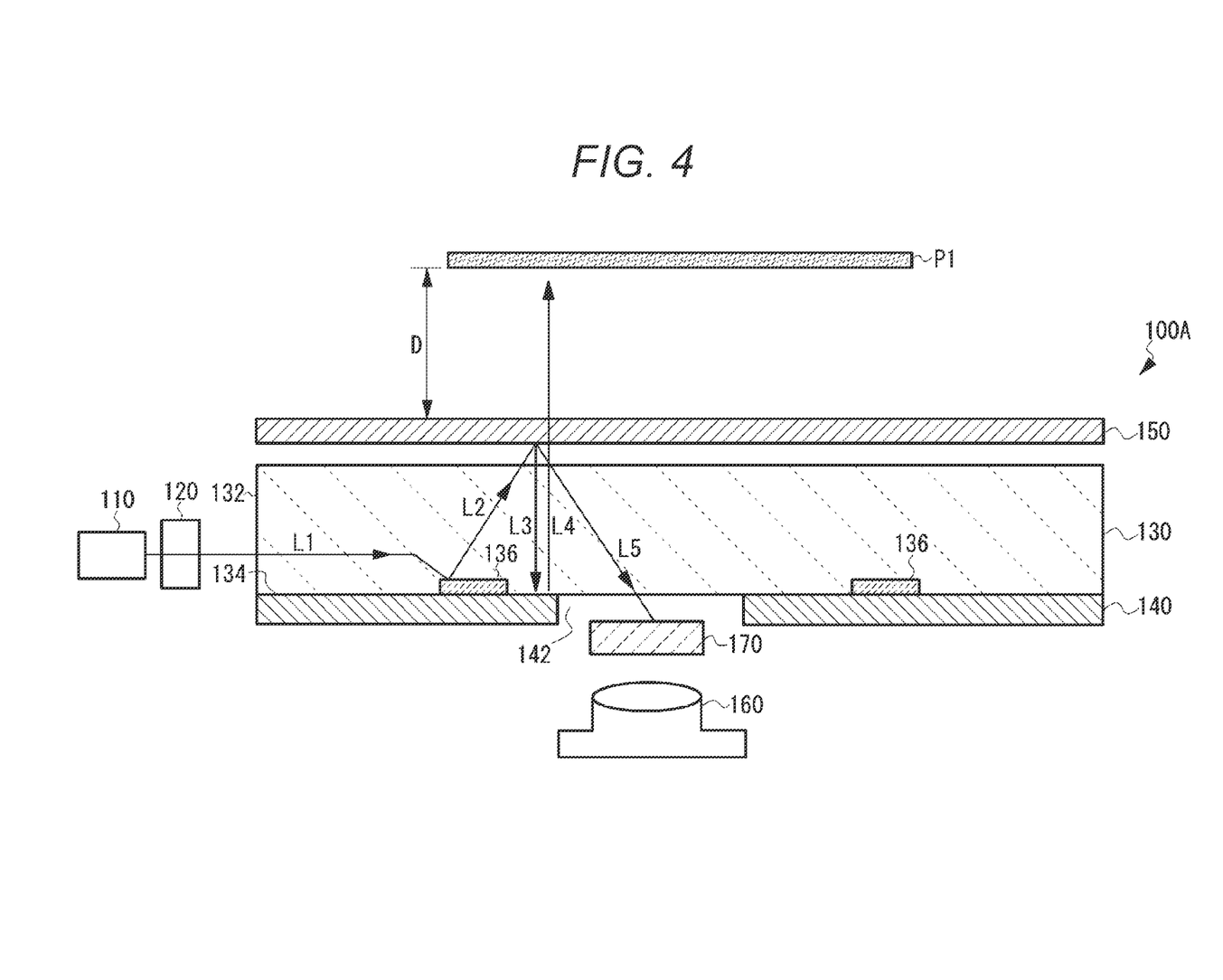
FIG. 4 is a schematic cross-sectional view of a biometric authentication device according to a second example of the present disclosure.

Next, a second example of the present disclosure will be described. FIG. 4 is a schematic cross-sectional view of a biometric authentication device 100A according to the second example of the present disclosure, and the same components as those of the first example are denoted by the same reference numerals.

As described in the first example, the imaging camera 160 images the palm H through the opening 142, but a part L5 of the light reflected by the polarization beam splitter 150 becomes stray light through the opening 142 and is taken into the imaging camera 160. When the stray light is captured, the SN ratio decreases, the image data is adversely affected, and the accuracy of the biometric authentication decreases.

Therefore, in the second example, the polarization filter 170 is interposed between the opening 142 and the imaging camera 160 so that the reflected light L5 from the polarization beam splitter 150 is not taken into the imaging camera 160. The polarization filter 170 has a polarization state that suppresses transmission of the reflected light L5 from the polarization beam splitter 150. For example, the polarization direction of the polarization filter 170 is different from the polarization direction of the polarization beam splitter 150, and for example, the polarization direction of the polarization filter 170 is orthogonal to the polarization direction of the polarization beam splitter 150. As a result, unnecessary reflected light L5 from the polarization beam splitter 150 is prevented from being taken into the imaging camera 160, and deterioration in quality of image data of the living body captured by the imaging camera 160 is prevented.

Figure 5A:
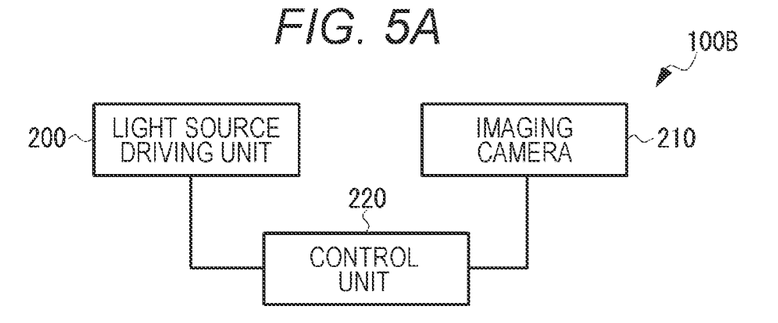
FIGS. 5A and 5B are block diagrams illustrating an electrical configuration of a biometric authentication device according to a third example of the present disclosure.

Next, a third example of the present disclosure will be described. FIG. 5A is a block diagram illustrating an electrical configuration of a biometric authentication device 100B according to the third example. The biometric authentication device 100B includes a light source drive unit 200 that drives a light source 110, an imaging camera 210 (imaging camera 160 in FIGS. 3 and 4) that captures an image of the living body in the vicinity of the aerial image P1, and a control unit 220 that controls each unit. In some embodiments, the control unit 220 and/or light source drive unit 200 may be implemented with circuitry, a controller, a hardwired processor, and/or a processor configured to execute instructions stored in a memory.

Figure 5B:
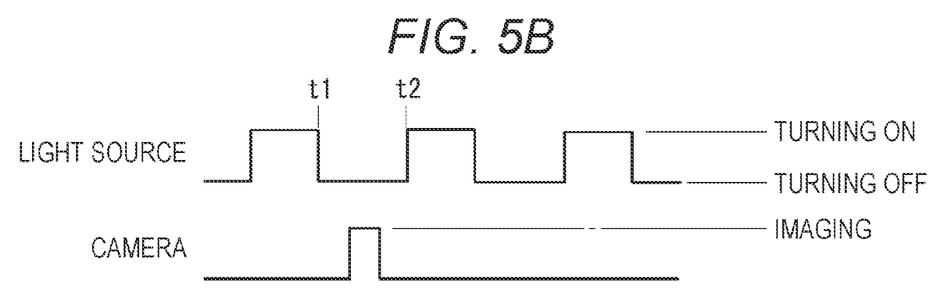

In the third example, as illustrated in FIG. 5B, the control unit 220 causes the light source 110 to be repeatedly turned on and off at a constant cycle via the light source drive unit 200, and causes the imaging camera 210 to image the living body during a period in which the light source 110 is turned off. For example, while the light source 110 is turned off between a time t1 and a time t2, the imaging camera 210 is caused to capture the image of the living body.

In this manner, the display of the aerial image P1 and the imaging of the imaging camera are time-divisionally controlled, and the living body is imaged during the period in which the reflected light L5 from the polarization beam splitter 150 does not occur, whereby it is possible to prevent stray light from being taken into the imaged image data. In the third example, the polarization filter 170 used in the second example is not necessarily required, but the polarization filter 170 may be interposed.

Next, a fourth example of the present disclosure will be described. In the fourth example, in a case where an infrared camera is used to capture an image of a vein or the like of a palm or the like, a visible light filter is used together with the polarization filter 170 used in the second example or instead of the polarization filter 170. The visible light filter cuts visible light, prevents visible light from entering the infrared camera, and transmits infrared light or the like having a wavelength other than visible light.

According to the present example, by interposing the visible light filter at the position matching the opening 142, it is possible to prevent visible light from being reflected in the infrared camera, increase the S/N of the infrared image data by cutting visible light noise, and improve the biometric authentication accuracy.

Figure 6:
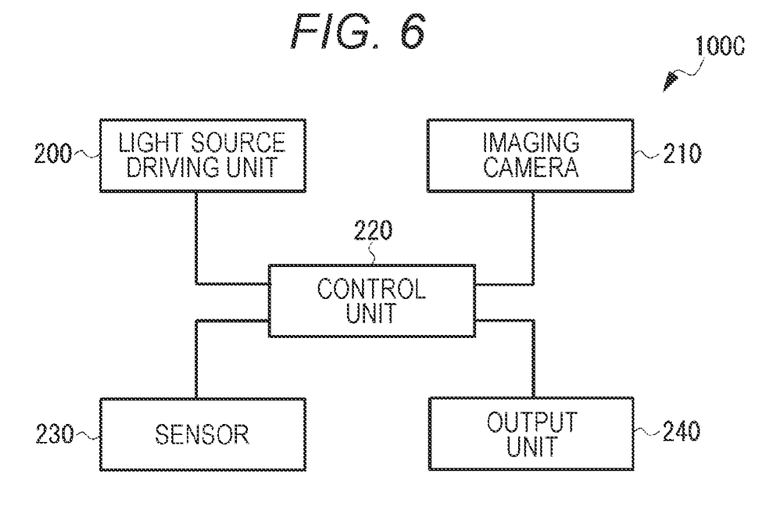
FIG. 6 is a block diagram illustrating an electrical configuration of a biometric authentication device according to a fifth example of the present disclosure.

Next, a fifth example of the present disclosure will be described. As illustrated in FIG. 6, a biometric authentication device 100C of the present example includes a sensor 230 that detects approach or distance of the living body and an output unit 240 in addition to the configuration of FIGS. 5A and 5B. In response to the sensor 230 detecting that the living body approaches the height D of the aerial image P1, the control unit 220 causes the imaging camera 210 to capture an image of the living body. Then, in response to the end of the imaging of the living body by the imaging camera 210, a sound (for example, beep sound) indicating the end of the imaging is output from the output unit 240. As a result, the user can know that imaging for authentication of the living body has been performed, and can return the palm H to the original position. In some embodiments, the output unit 240 may be implemented as a speaker associated with circuitry, a controller, a hardwired processor, and/or a processor configured to execute instructions stored in a memory.

Furthermore, as another aspect, in order to notify the user of the end of imaging by the imaging camera 210, the control unit 220 may blink the light source 110 via the light source drive unit 200 or turn on the light source 110 with brightness or color different from normal brightness or color. For example, in the case of urging imaging for the living body, the aerial image P1 may be displayed in blue, and the aerial image P1 may be displayed in green when the imaging is completed.

The biometric authentication device according to the present example can be applied to user input of any equipment, and can be applied to, for example, a computer device, in-vehicle electronic equipment, an ATM at a bank or the like, a ticket purchasing machine at a station or the like, or an input button for an elevator.

While there has been illustrated and described what is at present contemplated to be preferred embodiments of the present disclosure, it will be understood by those skilled in the art that various changes and modifications may be made, and equivalents may be substituted for elements thereof without departing from the true scope of the disclosure. In addition, many modifications may be made to adapt a particular situation to the teachings of the disclosure without departing from the central scope thereof. Therefore, it is intended that this disclosure not be limited to the particular embodiments disclosed, but that the invention will include all embodiments falling within the scope of the appended claims.

What is claimed is:

1. A biometric authentication device with a function of displaying an aerial image using retroreflection, the biometric authentication device comprising:
    a light guide layer on which a design for the aerial image is formed;
    a light source that irradiates the light guide layer with light;
    a polarization beam splitter disposed on one principal surface side of the light guide layer;
    a retroreflective layer disposed on a side of the other principal surface of the light guide layer, the other principal surface facing the one principal surface; and
    an imaging unit that captures an image of a living body in the vicinity of a region where the aerial image is displayed via an opening formed in the retroreflective layer;
    wherein the biometric authentication device performs biometric authentication based on the image captured by the imaging unit; and,
    wherein a polarization filter having a polarization direction different from that of the polarization beam splitter is provided at a position matching the opening.

2. The biometric authentication device according to claim 1, wherein the polarization direction of the polarization filter is orthogonal to a polarization direction of the polarization beam splitter.

3. The biometric authentication device according to claim 1, wherein the imaging unit captures an image of a living body at a time when the light source is turned off.

4. The biometric authentication device according to claim 3, wherein display of the aerial image and imaging of the imaging unit are time-divisionally controlled.

5. The biometric authentication device according to claim 1, wherein the imaging unit includes an infrared camera, and a visible light filter that shields visible light is provided at a position matching the opening.

6. The biometric authentication device according to claim 1, wherein the aerial image is generated at a position symmetrical to the design with respect to a surface of the polarization beam splitter, and a focal point of the imaging unit is adjusted to a position of the aerial image.

7. The biometric authentication device according to claim 1, further comprising: an output unit that notifies the user that imaging by the imaging unit has ended.

8. The biometric authentication device according to claim 1, wherein the living body is a fingerprint or a vein.

* * * * *